(12) United States Patent
Grabmeier

(10) Patent No.: US 11,214,436 B2
(45) Date of Patent: Jan. 4, 2022

(54) TRANSPORT PLATFORM

(71) Applicant: ALLOG GMBH, Gangkofen (DE)

(72) Inventor: Stefan Grabmeier, Gangkofen (DE)

(73) Assignee: Allog GmbH, Gangkofen (DE)

( * ) Notice: Subject to any disclaimer, the term of this patent is extended or adjusted under 35 U.S.C. 154(b) by 182 days.

(21) Appl. No.: 16/465,337

(22) PCT Filed: Nov. 23, 2017

(86) PCT No.: PCT/EP2017/080222
§ 371 (c)(1),
(2) Date: May 30, 2019

(87) PCT Pub. No.: WO2018/099800
PCT Pub. Date: Jun. 7, 2018

(65) Prior Publication Data
US 2019/0389651 A1 Dec. 26, 2019

(30) Foreign Application Priority Data
Nov. 30, 2016 (DE) ...................... 10 2016 014 249.9

(51) Int. Cl.
*B65D 88/00* (2006.01)
*B65D 88/12* (2006.01)
(Continued)

(52) U.S. Cl.
CPC .............. *B65D 88/129* (2013.01); *B60P 1/64* (2013.01); *B65D 90/006* (2013.01); *B65D 90/0026* (2013.01); *B60P 3/41* (2013.01)

(58) Field of Classification Search
CPC .............. B65D 88/129; B65D 90/0026; B65D 90/006; B65D 19/385; B65D 21/025;
(Continued)

(56) References Cited

U.S. PATENT DOCUMENTS 3,768,686 A 10/1973 Mappes
5,449,081 A * 9/1995 Sjostedt ............. B65D 90/0026
220/1.5

(Continued)

FOREIGN PATENT DOCUMENTS

| CN | 1781827 A | 6/2006 |
|---|---|---|
| DE | 4338158 A1 | 5/1995 |
| DE | 19849665 A1 | 5/1999 |

*Primary Examiner* — Stephen T Gordon
(74) *Attorney, Agent, or Firm* — Laurence A. Greenberg; Werner H. Stemer; Ralph E. Locher

(57) ABSTRACT

A transport platform for loading, conveying, and storing elongated loads which are cut to length, in particular round wood, includes a support structure with a base assembly which is made of longitudinal and transverse supports. A base-side corner fitting is provided on each of the four corner regions of the base assembly, and the transport platform can be locked on a semi-trailer contour, for example of a semitrailer of a truck or another transportation device, by the corner fitting. The base assembly additionally has a vertical support on each of the four corner regions. The vertical support terminates with an upper corner fitting, to which an additional transport platform stacked thereon can be locked or into which a container stacker for loading the transport platform engages.

13 Claims, 6 Drawing Sheets

(51) Int. Cl.
*B60P 1/64* (2006.01)
*B65D 90/00* (2006.01)
*B60P 3/41* (2006.01)

(58) Field of Classification Search
CPC .. B65D 88/21; B65D 88/123; B65D 90/0013; B65D 90/0006; B65D 2590/0058; B65D 2590/0025; B60P 1/64; B60P 3/41; B60P 7/12; B60P 3/40
USPC .............................. 410/32, 35, 36, 37, 42, 46
See application file for complete search history.

(56) References Cited

U.S. PATENT DOCUMENTS

| | | | | |
|---|---|---|---|---|
| 5,688,086 | A * | 11/1997 | Menzemer | B65D 90/0026 |
| | | | | 410/49 |
| 5,816,423 | A * | 10/1998 | Fenton | B65D 88/121 |
| | | | | 220/1.5 |
| 9,545,874 | B1 * | 1/2017 | Whitsell | B60P 7/12 |
| 2002/0009345 | A1 | 1/2002 | Clive-Smith | |
| 2002/0150438 | A1 * | 10/2002 | Coray | B60P 3/41 |
| | | | | 410/37 |
| 2012/0074012 | A1 | 3/2012 | Crane | |
| 2015/0367986 | A1 * | 12/2015 | Etchegary | B65D 88/129 |
| | | | | 108/53.5 |

* cited by examiner

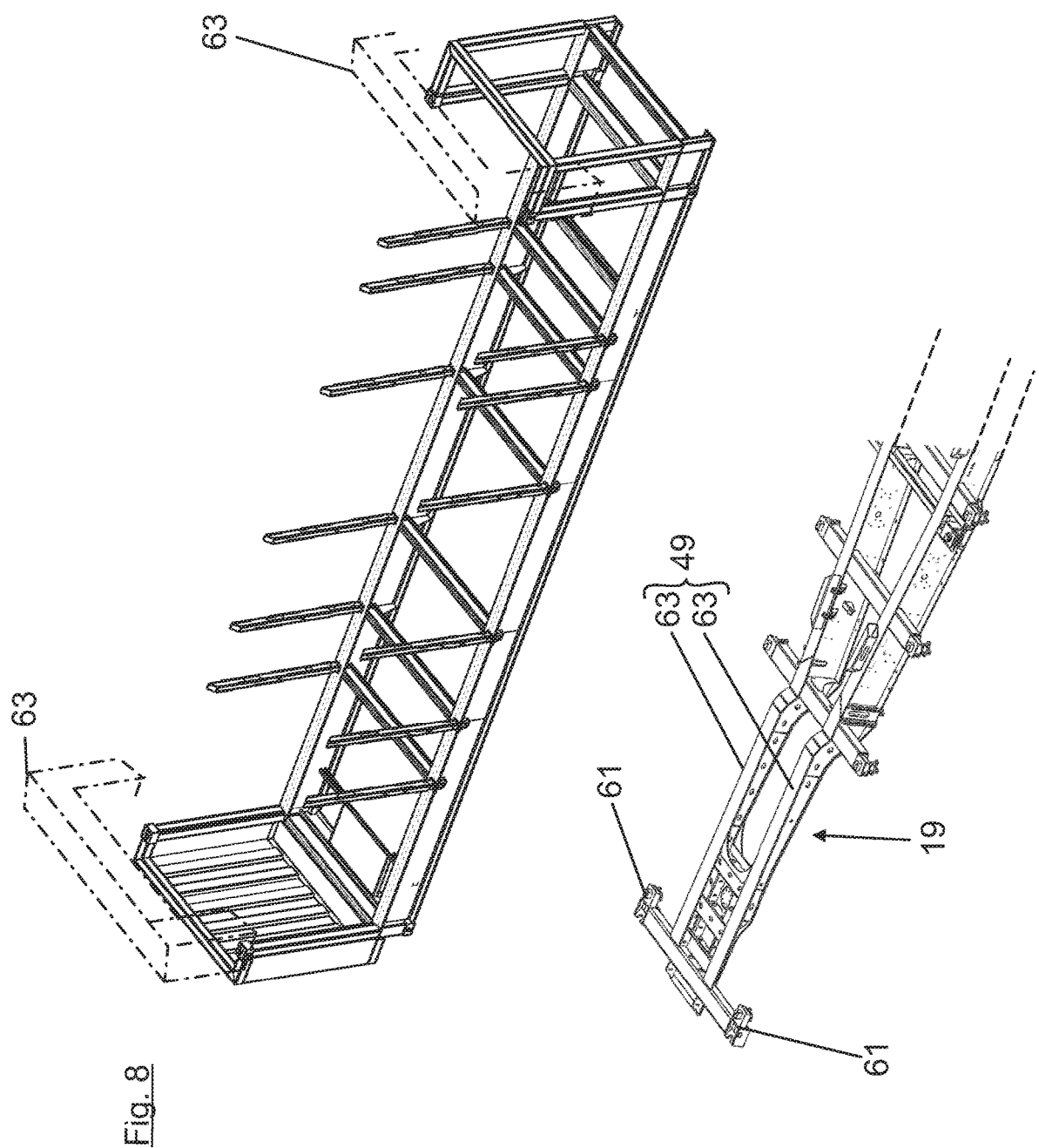

TRANSPORT PLATFORM

BACKGROUND OF THE INVENTION

Field of the Invention:

The invention relates to a transport platform for loading, conveying, and storing elongated cargo that has been cut to length, in particular round wood.

In common practice, round logs or tree trunks are transferred individually between different transport modes. As an example, at a loading station, round wood is transferred individually between the railway and a semi-tractor trailer, with a crane usually attached to the truck. The complete reloading process is therefore associated with very long reloading times and thus high personnel costs. In addition, a loading crane must be attached to the truck in order to carry out the loading process.

The use of standardized ISO steel containers is also commonly known, and enables loading, conveying, storing and unloading various types of cargo quickly and easily. The ISO containers may, for example, be provided as 20-foot containers or as 40-foot containers. Such an ISO container may be completely or partially closed with end walls, bottom walls, top walls and/or side walls. The ISO container likewise has standardized ISO corner fittings ("container corners") on its eight outer corners, and these may be used to lock the ISO container quickly and easily to, for example, the semi-trailer contour of a semi-tractor trailer or other transport mode, and to stack the ISO containers in on top of one another in a plurality of layers.

SUMMARY OF THE INVENTION

The object of the invention is to provide a transport platform that is especially suitable for transporting elongated, cut-to-length cargo, in particular round wood, and that enables reducing the handling times for transferring the cargo between different transport modes. The problem is solved by a support structure with a base assembly which is made of longitudinal and transverse supports, wherein a base-side corner fitting is furnished on each of the four corner regions of the base assembly, and the transport platform may be locked on a semi-trailer contour, for example of a semi-tractor trailer or another transportation device, by using the corner fitting, and wherein the base assembly additionally has a vertical support on each of the four corner regions, the vertical support terminating with an upper corner fitting, to which an additional transport platform stacked thereon may be locked or into which a container stacker engages for loading the transport platform. Preferred refinements of the invention are disclosed in the dependent claims.

According to the invention, the round logs are no longer transferred individually between the semi-tractor trailer and the railroad trailers at the loading station, for example. Instead, a transport platform is provided that is specially designed for loading, conveying, storing and unloading such round logs (or elongated cut-to-length cargo in general) quickly and easily. The transport platform is realized as an open support structure with a base assembly consisting of longitudinal and transverse supports. A base-side corner fitting is furnished at each of the four corner areas of the base assembly, and by means of that fitting, the transport platform may be locked to a semi-trailer contour, such as a semi-tractor trailer or another transport mode. In addition, the base assembly has a vertical support at each of its four corner areas, and this vertical support ends with an upper corner fitting. This ensures that the transport platform may be stacked in a plurality of layers. An additional transport platform may be stacked on the transport platform and locked by means of the upper corner fittings. Alternatively, a container stacker may engage in the upper corner fittings in order to load the transport platform. Such container stackers are in widespread use for loading ISO containers and are used, for example, at loading stations. In this way, the transport platform may be easily transferred in the manner of an ISO container between different modes of transport, for example between the railway and a semi-tractor trailer rig, using a container stacker to transfer the ISO containers. The round logs therefore no longer have to be transferred by a truck crane, which results in massive time savings during the loading process.

It is preferable if the upper and lower corner fittings are implemented as ISO container corner fittings, in the manner that these are installed in an ISO container. The distances between the upper and lower corner fittings may also be substantially identical to the distances between the ISO container corner fittings installed in the ISO container.

In a technical implementation, the base assembly of the transport platform may have two parallel lateral longitudinal supports. These may be interconnected by forming a closed supporting frame, at least via frontal transverse supports. The base assembly formed in this way is preferably designed as an open steel support structure, i.e. without sheet metal planking between the transverse and longitudinal supports. For laterally securing the round logs for transport, it is preferable if the base assembly has stanchions on both sides. The stanchions are respectively attached, either fixedly or detachably, to the connecting points of the base assembly, i.e. the two longitudinal supports. A detachable plug system is preferred, in which the stanchion may be detachably inserted into a stanchion pocket positioned on the longitudinal support. In this way, the stanchion may easily be replaced for purposes of repair.

Platform stability may be increased by aligning the stanchions in the platform transverse direction. In addition, the two longitudinal supports may be interconnected respectively via cross struts at the stanchion connecting points. The cross struts and the stanchions thus converge at the stanchion connecting points of the longitudinal supports to form a node, via which forces may be transferred to the support structure.

In order to increase the loading volume available to the transport platform, the transport platform may be extended in the platform longitudinal direction beyond the base-side corner fittings, by means of at least one overhang. In the case of a transport platform loaded on a semi-tractor trailer, the overhang may be positioned on the rear side of the semi-trailer. To realize the rear overhang, the two lateral longitudinal supports may be extended beyond the rear base-side corner fittings and end with a closed vertical frame. The rear vertical frame may be made up of a base-side cross strut that connects the two longitudinal supports to each other, as well as vertical struts that are respectively welded to the longitudinal supports and are connected to an upper cross strut at the top. The upper cross strut and the vertical struts of the vertical frame converge at the upper frame corners. To further increase platform stability, the two upper frame corners may be connected via longitudinal struts to the upper corner fittings of the rear vertical supports. To reduce the platform weight, the rear overhang may be designed as an open support structure, i.e. completely without sheet metal planking. Alternatively and/or additionally, the transport platform may have another overhang on the opposite end face. This overhang protrudes toward the cab when it is loaded onto the semi-tractor trailer. The cab-side overhang may be offset from the underside of the platform by a height offset, forming a base-side free space. In addition, the overhang is dimensioned in such a way that adjacent components of the truck cab or semi-tractor trailer rig, such as hydraulic lines or the like, are separated from the transport platform by a sufficiently large clearance.

In a preferred embodiment, the cab-side overhang may be a box-shaped support structure made up of transverse and longitudinal struts in combination with sheet metal planking. The sheet metal planking has a front wall facing the truck cab, which is connected via a base wall to the front transverse support of the transport platform and is connected via side walls to the vertical supports of the transport platform. Both the cab-side overhang and the rear overhang may be open at the top, i.e. without a top cover, so as not to interfere with the loading process.

In one refinement, the base assembly of the transport platform may have a centering profile on the underside which may be brought into a positive fit with a corresponding counter-profile of the semi-trailer when loading the transport platform onto a semi-tractor trailer rig, to ensure that the transport platform is correctly positioned on the trailer. The centering profile may be realized as a centering plate part, which has a centering area that is set back and upwards in the platform height direction, forming a center tunnel open at the bottom, and in the platform transverse direction merges outwards into inclined ramps. The corresponding counter-contour of the semi-tractor trailer may be achieved by means of upwardly-bent guide rails of a "gooseneck" type semi-trailer chassis, which the platform-side centering plate part is positively fitted over when the transport platform is lowered into the correct position. The centering plate part is preferably connected, in the platform longitudinal direction, at the front to the cab-side transverse support and at the rear to a cross strut that connects the two longitudinal supports.

Locking elements (e.g. twistlocks) for locking transport platforms to each other and/or to a carrier vehicle are known in the art; with their aid, the corner fittings may be brought into a positive-fit connection with the support vehicle or with another transport platform.

The advantageous embodiments and/or refinements of the invention that are described above and/or reflected in the dependent claims, may be applied individually or in any combination except, for example, in cases of unambiguous dependencies or incompatible alternatives.

The invention and its advantageous embodiments and refinements, as well as the advantages thereof, are explained below in greater detail with reference to drawings.

BRIEF DESCRIPTION OF THE SEVERAL VIEWS OF THE DRAWING

FIG. 8 shows a view of a loading process in which the transport platform is loaded onto a semi-trailer.

DESCRIPTION OF THE INVENTION

Figure 1:
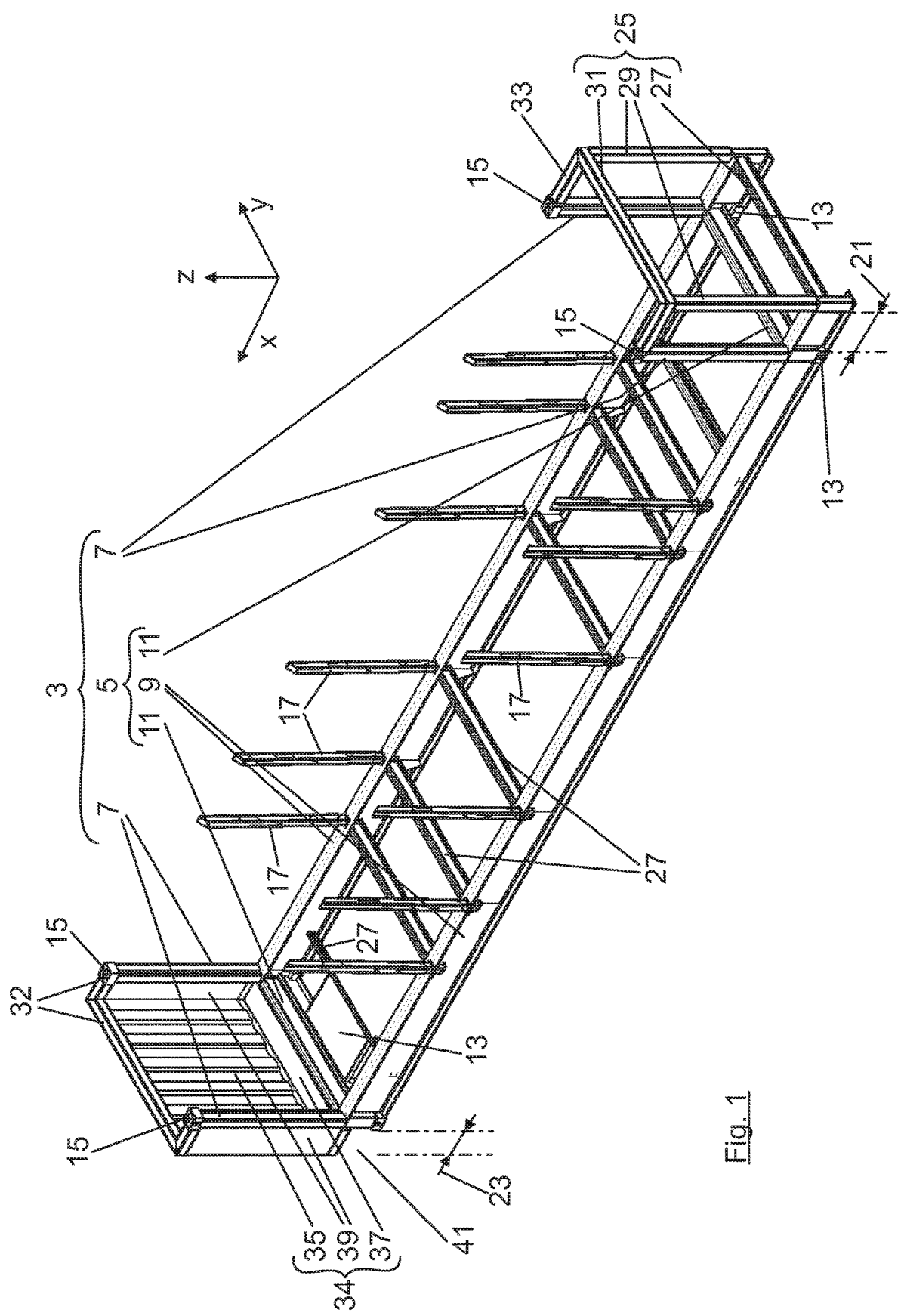
FIG. 1 shows a perspective view of the transport platform in isolation.

In the following, the structure of a transport platform specially designed for loading round logs 1 (FIG. 7) is described with reference to FIG. 1. The transport platform is realized as an open support structure 3 having a base assembly 5 and vertical support 7, largely without sheet metal planking that is closed over extensive areas. In FIG. 1, the base assembly 5 has two parallel lateral longitudinal supports 9, which extend in the platform longitudinal direction x and form a closed supporting frame in combination with the front transverse supports 11. The longitudinal and transverse supports 9, 11 in the drawings are implemented as steel I-beam parts, but are not limited to such an I-beam profile.

Base-side corner fittings 13 are respectively welded at each of the four corner areas of the base assembly 5. In addition, each of the four corner areas of the base assembly 5 has the aforementioned vertical supports 7 that protrude upwards in the platform height direction z and terminate at the top with upper corner fittings 15. The upper and lower corner fittings 13, 15 are implemented as standardized ISO container corner fittings with fastening eyelets 16 (FIG. 5 or 6) with which the locking elements 61 described below may engage. The distances between the upper and lower corner fittings 13, 15 are also substantially identical to the standardized distances between ISO container corner fittings in an ISO container. In this exemplary embodiment, the distances between the upper and lower corner fittings 13, 15 in the platform longitudinal direction x, platform longitudinal direction y and platform height direction z are respectively modelled on the corresponding distances between container corner fittings in a 40-foot ISO container.

To ensure that the round logs 1 are secured laterally for transport, stanchions 17 are respectively attached to each of the two lateral longitudinal supports 9; the connection of the stanchions to the longitudinal supports 9 is explained below with reference to FIGS. 2 and 3.

The support structure 3 of the transport platform is specially designed for loading onto a semi-tractor trailer 19, the chassis of which is partially indicated in FIG. 8. When loaded, the left side of the transport platform in FIG. 1 faces the truck cab and the right side of the transport platform is positioned on the rear side of the semi-trailer. As FIG. 1 also illustrates, the transport platform is extended, as viewed in the platform longitudinal direction x, frontally beyond the base-side corner fittings 13 with a rear projection 21 and a cab-side overhang 23. Both overhangs 21 and 23 are open at the top so as not to interfere with the process of loading from above.

To realize the rear overhang 21, the two lateral longitudinal supports 9 extend continuously over the base-side corner fittings 13 and terminate these on a closed vertical frame 25. The vertical frame 25, which is closed at the circumference, is made up of a base-side cross strut 27 that runs between the two longitudinal supports 9, and vertical struts 29 that converge with an upper cross strut 31 at the upper frame corners. The two upper frame corners of the vertical frame 25 are connected to the upper corner fittings 15 of the vertical supports 7 via longitudinal struts 33 in order to increase platform stability, especially in the rear area. Together with the vertical frame 25 that is closed at the rear, the rear vertical supports 7 accordingly form a stable open support structure, by means of which the rear side of the transport platform is stiffened in a weight-saving manner.

Figure 5:
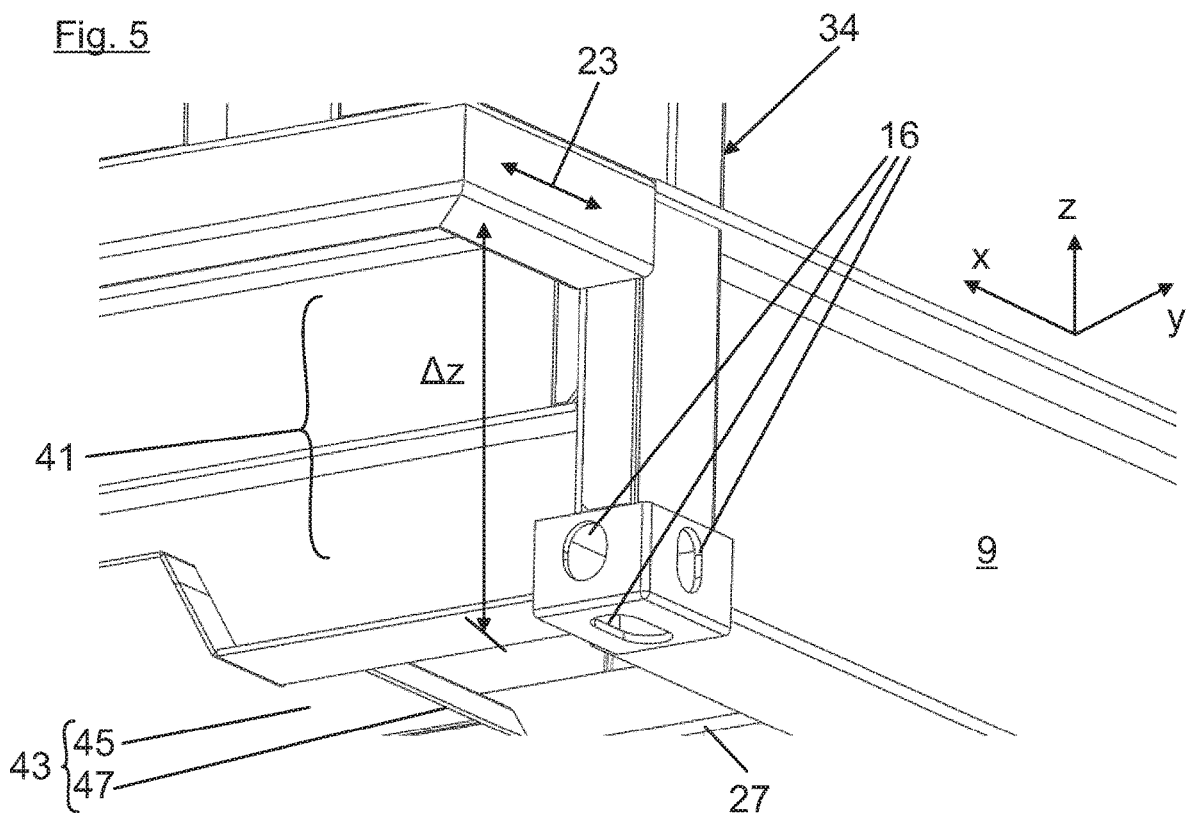
Figure 6:
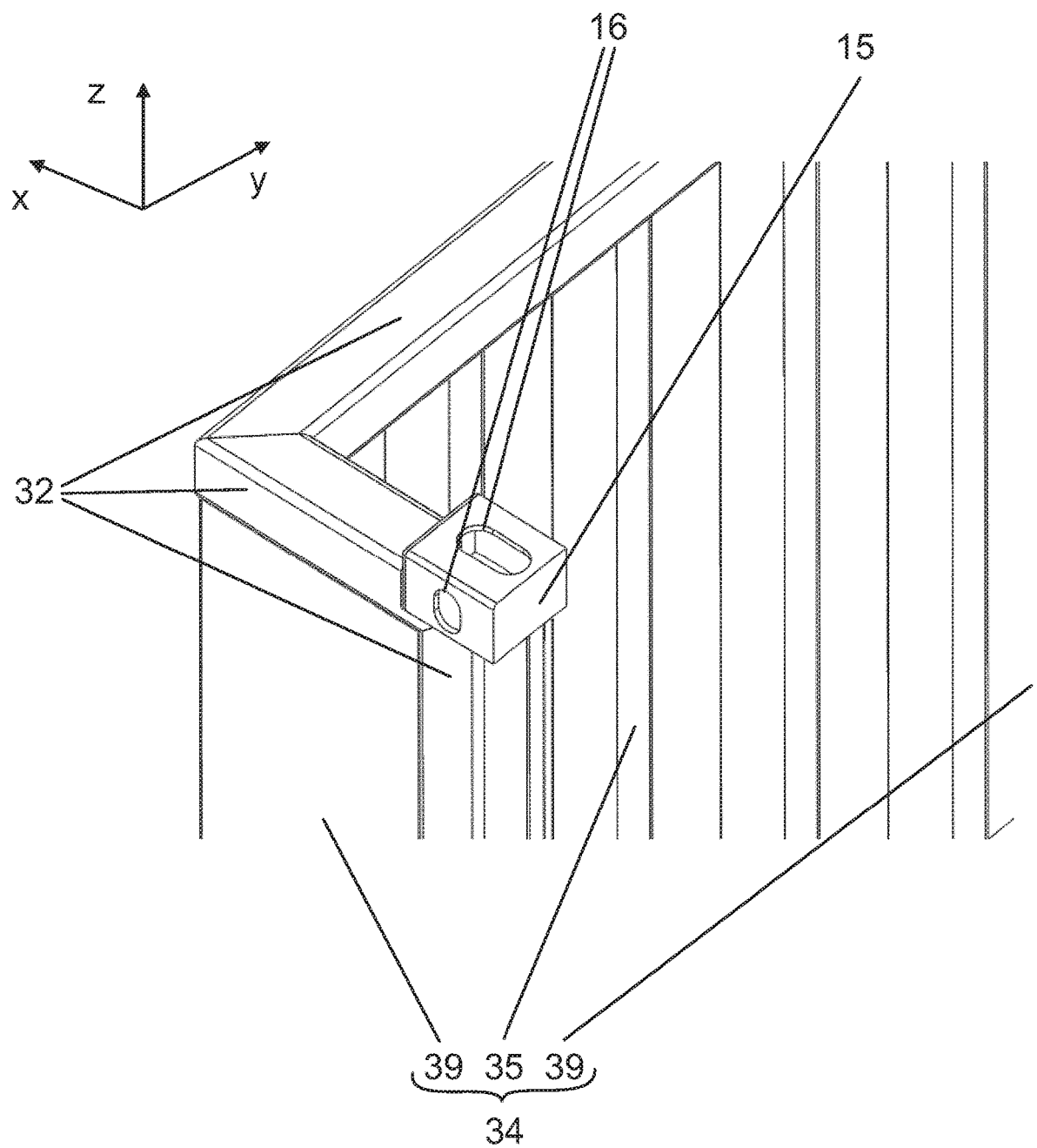

In contrast to the open support structure of the rear overhang 21, the forward protruding cab-side overhang 23 is box-shaped and closed with a sheet metal planking 34, which is limited by vertical, longitudinal and cross struts 32 (FIG. 1 or 6). The sheet metal planking 34 has an end face 35 facing the truck cab, which is connected via a base wall 37 to the forward front transverse support 11 and is connected via side walls 39 to the front vertical supports 7 of the transport platform. The cab-side overhang 23 is structured in such a way that there is sufficient clearance for the adjacent components of the truck cab and the semi-tractor trailer 19, for example during a steering operation. Accordingly, the base wall 37 of the cab-side overhang 23 is offset from the platform underside by a height offset $\Delta \zeta$ (FIG. 5), forming a base-side free space 41. When the transport platform is positioned on the semi-tractor trailer 19, semi-trailer components, such as hydraulic lines or the like, are arranged in the area of the base-side free space 41.

As FIG. 1 further shows, the front underside of the transport platform has a centering plate part 43 which is formed in the course of forming a center tunnel that is open downwards with a centering area 45 (FIG. 5) which is set back upwards in the platform height direction z and merges outwards merges outwards into inclined ramps 47 in the platform transverse direction y (FIG. 5). The centering plate part 43 is welded on the front of the front transverse support 11 and welded to the rear of a base-side cross strut 27, in the platform longitudinal direction x. The centering plate part 43 cooperates with a corresponding counter-profile 49 (FIG. 8) on the semi-tractor trailer 19 to ensure that the transport platform is correctly positioned on the semi-tractor trailer 19. In FIG. 8, the counter-profile 49 of the semi-tractor trailer 19 is formed from two upwardly-offset semi-trailer longitudinal supports 63.

Figure 2:
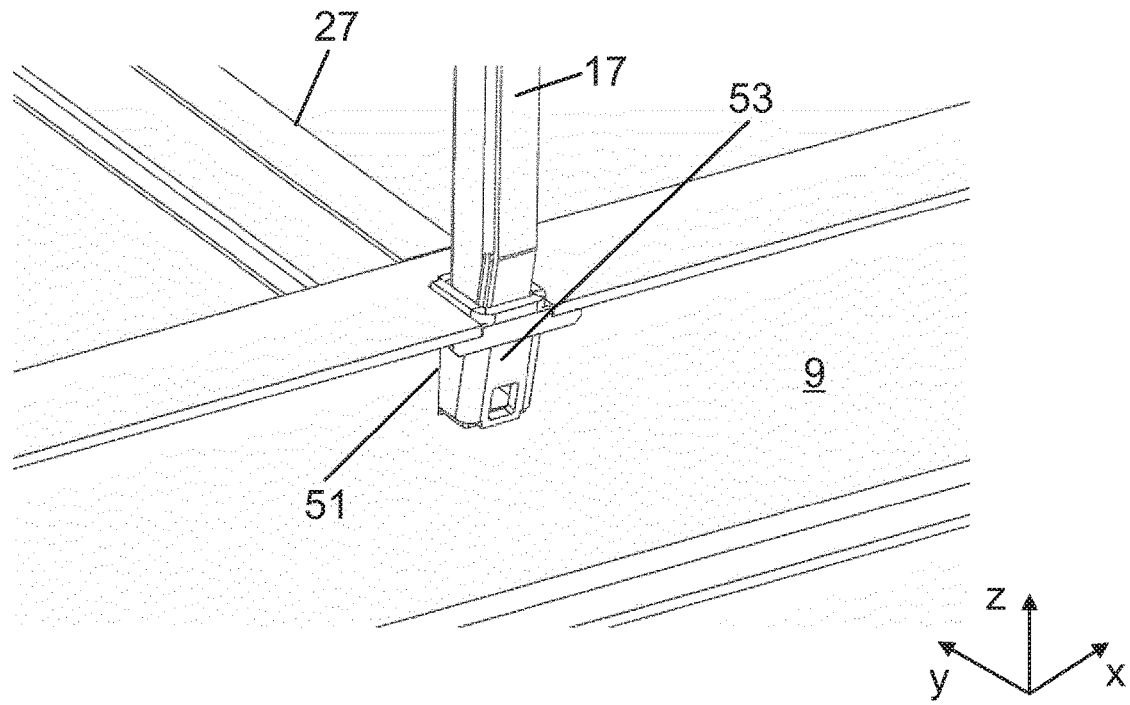
FIGS. 2 to 6 respectively show detail views of the transport platform.
Figure 3:
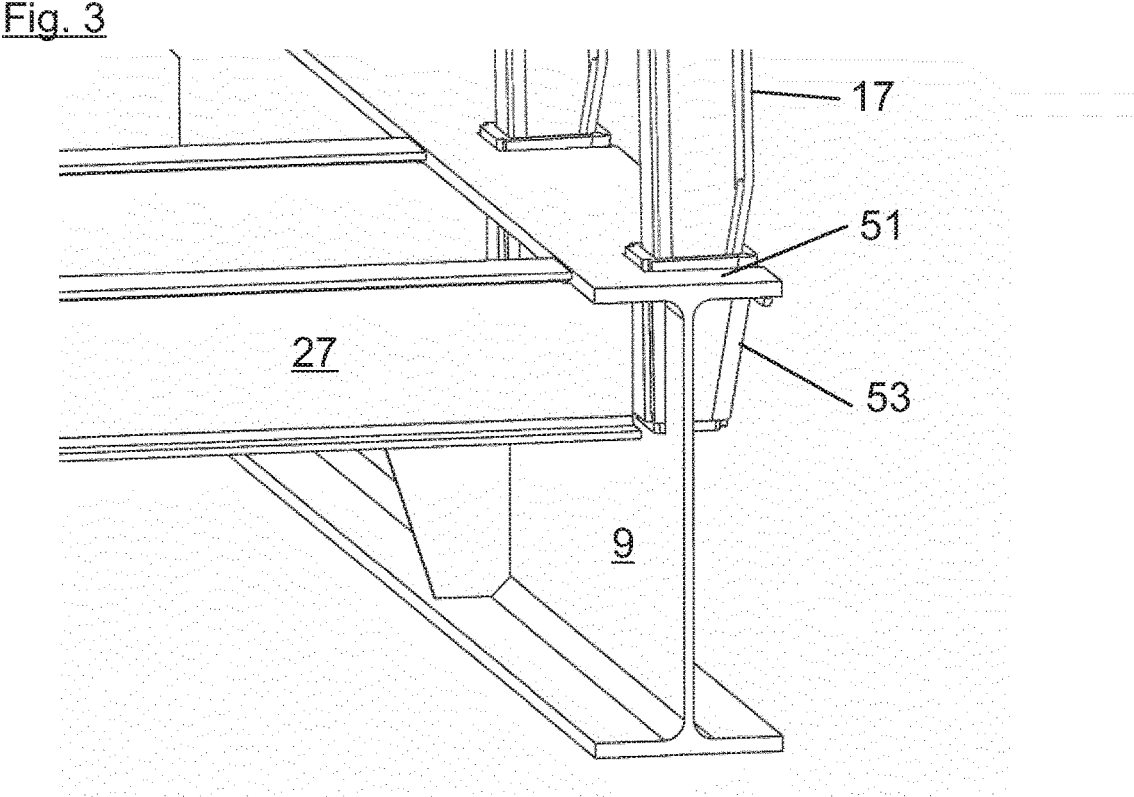

FIGS. 2 and 3 respectively show detailed views of the plug system by which the stanchions 17 are detachably attached to the longitudinal supports 9. The plug system has a stanchion pocket 53, which is inserted into a material recess 51 of the longitudinal support and welded thereto. The lower wedge-shaped end of the stanchion 17 may be positively fitted into the stanchion pocket 53, which is likewise wedge-shaped. The stanchion 17 may optionally be secured in the stanchion pocket 53 using a securing means, not shown.

Figure 4:
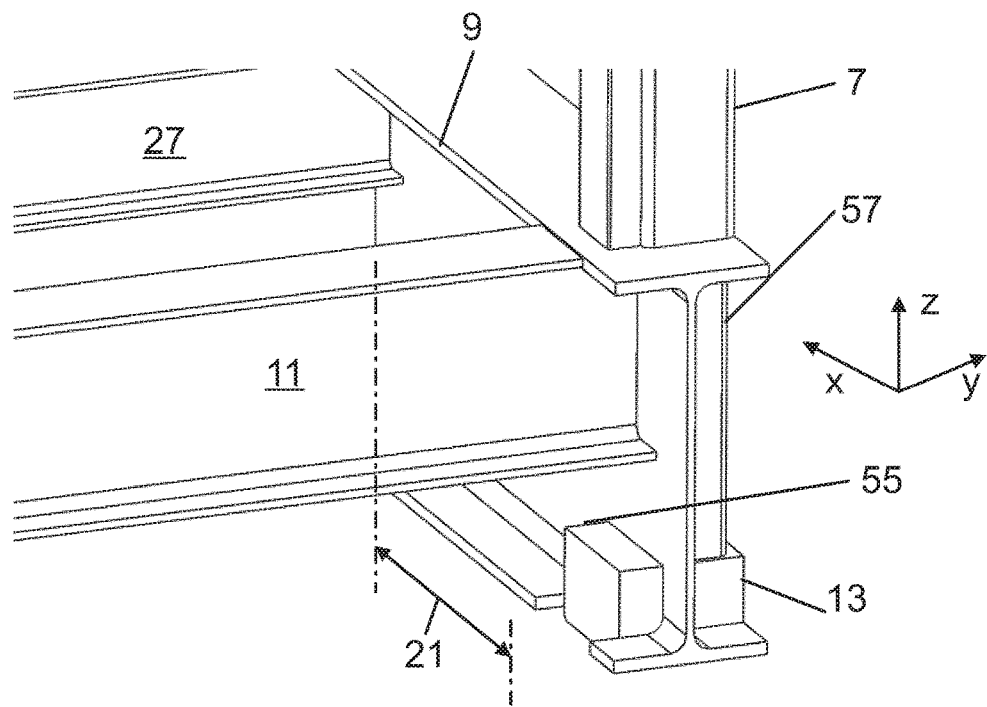

To increase platform stability, two laterally opposite stanchions 17 are respectively arranged so that they are aligned in a transverse plane yz in the platform transverse direction y. In addition, in each transverse plane yz, there runs a cross strut 27 that is respectively connected to the stanchion connecting points of the lateral longitudinal supports 9. FIG. 4 shows a further detailed view of a part of the rear overhang 21. As a result, the longitudinal support 9 extends continuously beyond the base-side corner fitting 13 to the rear vertical frame 25. At the shown lower frame corner of the vertical frame 25, the base-side cross strut 27 and the vertical strut 29 converge forming a lower frame corner at the longitudinal support 9.

As FIG. 4 shows, the cuboid lower corner fitting 13 is welded into an additional material section 55 of the longitudinal support 9 and the transverse support 11. The lower corner fitting 13 is arranged in alignment with the rear vertical support 7 when viewed in the platform height direction z. For corner reinforcement in FIG. 4, a U-profile reinforcing plate part 57 is supported between the base-side corner fitting 13 and the upper T-flange of the longitudinal support 9. Corresponding reinforcing plate parts 57 are also fitted to the other base-side corner fittings 13.

Figure 7:
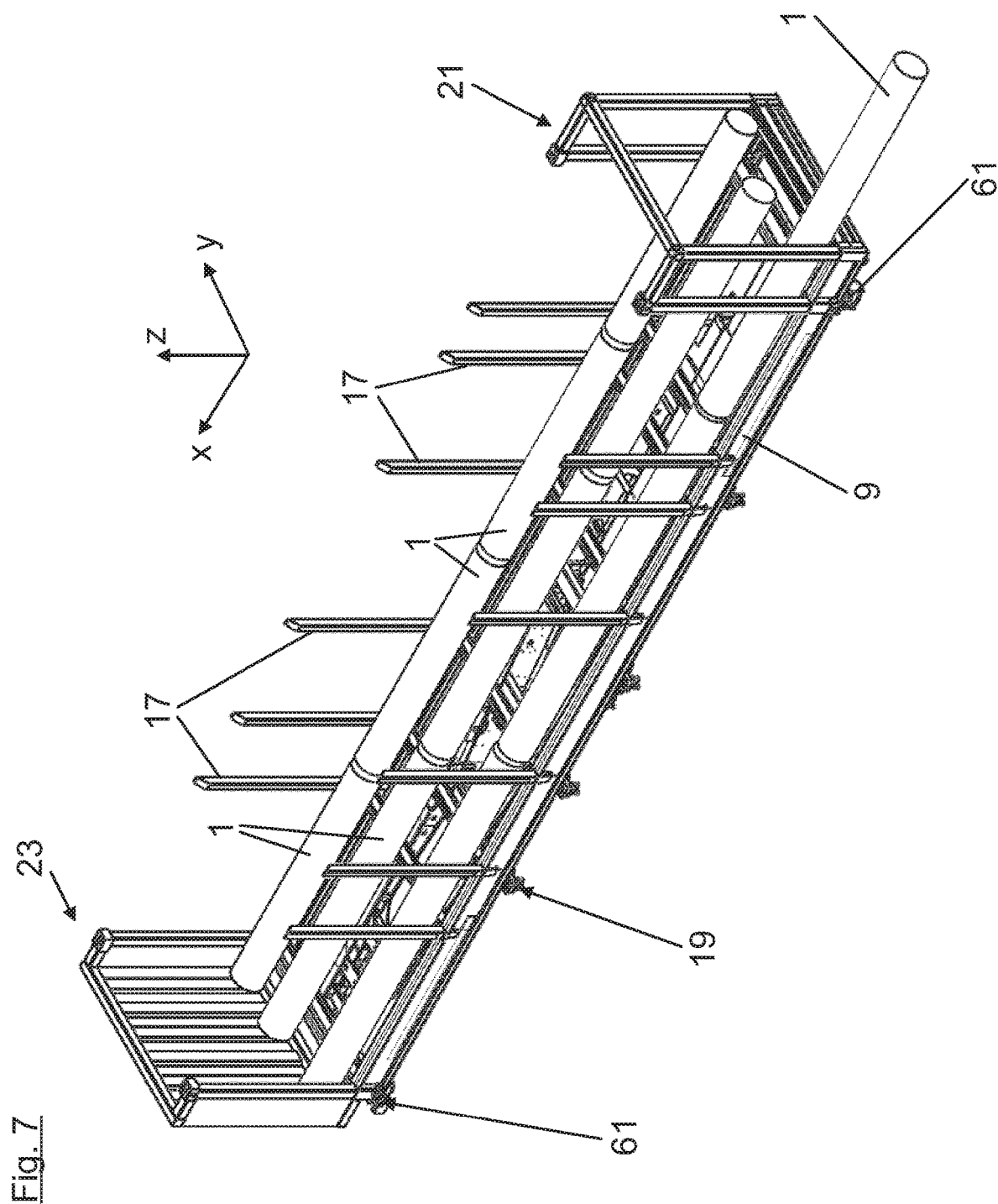
FIG. 7 shows a perspective representation of a transport platform loaded onto a semi-trailer.

FIG. 7 shows a transport platform that is partially laden with round logs 1 and is transferred onto the semi-trailer 19. Only the chassis of the semi-trailer 19 is shown in FIGS. 7 and 8. To secure the transport platform, chassis-side locking elements 61, for example twistlocks, engage and lock with the lower ISO corner fittings 13 of the transport platform. To secure the round logs 1 during transport, tensioning belts may commonly be used to tighten the round logs 1 on the transport platform. The tensioning belt retractors required for this may be provided loose, in a first variant embodiment, or fixed to the transport platform as permanently mounted attachments, in a preferred second variant.

FIG. 8 illustrates a loading process for the empty transport platform. As shown, the transport platform is lowered onto the chassis of the semi-tractor trailer 19 by means of a gripper 63 of a container stacker, which is only roughly indicated. The gripper 63 is engaged with the four upper ISO corner fittings 15 of the transport platform and is locked with these by actuating the locking elements (for example, twist locks). During the lowering process, the transport platform is placed in the correct position on the chassis of the semi-trailer 19 by means of the container stacker, and as a result, the chassis-side locking elements 61 engage with the lower ISO corner fittings 13 of the transport platform and are locked with these. The semi-trailer chassis shown in FIG. 8 has a "gooseneck" design in which the semi-trailer longitudinal supports 63 are offset upwards by a height offset z and form the counter-profile 49, and interacts with the centering plate part 43 of the transport platform.

LIST OF REFERENCE SIGNS

1 Round logs
3 Support structure
5 Base assembly
7 Vertical support
9 Longitudinal support
11 Transverse support
13 Lower corner fittings
15 Upper corner fittings
16 Fastening eyelets
17 Stanchion
19 Semi-trailer
21 Rear overhang
23 Cab-side overhang
24 Vertical frame
27 Base-side cross strut
29 Vertical strut
31 Upper cross strut
32 Longitudinal, cross and vertical struts
33 Longitudinal strut
34 Sheet metal planking
35 End wall
37 Base wall
39 Side walls
41 Free space
43 Centering plate part
45 Centering area
47 Inclined ramps
49 Counter-profile
51 Material recess
53 Stanchion pocket
55 Material recess
57 Reinforcing plate part
61 Closure elements
63 Semi-trailer longitudinal support
65 Container stacker gripper

The invention claimed is:
1. A transport platform for loading, conveying and storing elongated loads cut to length or round wood, the transport platform comprising:
a support structure including a base assembly being made of longitudinal and transverse supports, said base assembly having four corner regions, said longitudinal supports including two mutually parallel lateral longitudinal supports and said transverse supports including at least frontal transverse supports interconnecting said lateral longitudinal supports to form a closed supporting frame;

said base assembly including base-side lower corner fittings each being furnished on a respective one of said four corner regions, said lower corner fittings permitting the transport platform to be locked on a semi-trailer contour of a semi-tractor trailer or another transportation device; and said base assembly including vertical supports each being disposed at a respective one of said four corner regions, said vertical supports each terminating with a respective upper corner fitting for locking an additional transport platform stacked on said upper corner fittings or for engaging a container stacker in said upper corner fittings for loading the transport platform;

said base assembly having an underside and a centering profile on said underside, said centering profile configured to be form-lockingly fitted against a corresponding counter-profile of the semi-tractor trailer upon loading the transport platform on the semi-tractor trailer in order to ensure the transport platform being correctly positioned on the semi-tractor trailer; and said centering profile being a centering plate part having a profile surface being set back and upwards in a platform height direction and merging outwards into inclined ramps in a transverse direction of the platform.

2. The transport platform according to claim 1, wherein said upper and lower corner fittings are ISO corner fittings, and said upper and lower corner fittings define spacings therebetween being substantially identical to spacings between ISO corner fittings of an ISO container or a 40-foot shipping container.

3. The transport platform according to claim 1, wherein said base assembly includes two sides, connecting points and stanchions on both of said sides for securing the loads during transport, said stanchions being fixedly or detachably connected to said connecting points.

4. The transport platform according to claim 3, wherein said connecting points are part of said two longitudinal supports.

5. The transport platform according to claim 3, wherein said stanchions are disposed in pairs on opposite longitudinal sides of said base assembly.

6. The transport platform according to claim 5, which further comprises cross struts interconnecting said two longitudinal supports at said connecting points of said pairs of stanchions.

7. The transport platform according to claim 1, which further comprises at least one overhang extending the transport platform beyond said base-side lower corner fittings in a longitudinal direction of the transport platform, said at least one overhang being disposed at a rear side of the semi-tractor trailer when the transport platform is loaded on the semi-tractor trailer.

8. The transport platform according to claim 7, which further comprises a closed vertical frame formed of a base-side cross strut, an upper cross strut and vertical struts converging at two upper frame corners, said two lateral longitudinal supports being extended beyond said base-side corner fittings and terminating on said closed vertical frame to provide said at least one overhang.

9. The transport platform according to claim 8, which further comprises longitudinal struts connecting said two upper frame corners to said upper corner fittings of said vertical supports in said closed vertical frame.

10. The transport platform according to claim 7, which further comprises an overhang projecting toward a truck cab when loaded onto a truck trailer.

11. The transport platform according to claim 10, wherein said overhang projecting toward the truck cab is offset from an underside of the transport platform by a height offset forming a base-side free space.

12. The transport platform according to claim 10, wherein said transverse supports include a front transverse support, said overhang projecting toward the truck cab is closed in a box-shape and includes sheet metal planking having an end wall facing the cab, a base wall connecting said planking to said front transverse support and side walls connecting said planking to ones of said vertical supports.

13. The transport platform according to claim 1, wherein said transverse supports include a cab-side transverse support, a cross strut interconnects said longitudinal supports, and said centering plate part is connected in a longitudinal direction of the platform to the cab-side transverse support and to said cross strut.

* * * * *